(12) United States Patent
Nakajima

(10) Patent No.: US 7,501,716 B2
(45) Date of Patent: Mar. 10, 2009

(54) POWER SUPPLY APPARATUS

(75) Inventor: Shigeto Nakajima, Kanagawa (JP)

(73) Assignee: NEC Electronics Corporation, Kawasaki, Kanagawa (JP)

( * ) Notice: Subject to any disclaimer, the term of this patent is extended or adjusted under 35 U.S.C. 154(b) by 95 days.

(21) Appl. No.: 11/409,971

(22) Filed: Apr. 25, 2006

(65) Prior Publication Data

US 2006/0256491 A1 Nov. 16, 2006

(30) Foreign Application Priority Data

May 11, 2005 (JP) .............................. 2005-138185

(51) Int. Cl.
*H02J 1/00* (2006.01)
*H02J 3/00* (2006.01)
*H02J 3/14* (2006.01)

(52) U.S. Cl. ....................................................... 307/38

(58) Field of Classification Search .................. 307/38, 307/85, 115; 361/90
See application file for complete search history.

(56) References Cited

U.S. PATENT DOCUMENTS 6,147,477 A * 11/2000 Saeki et al. .................. 323/273
2006/0238944 A1* 10/2006 Yamamoto .................. 361/93.1

FOREIGN PATENT DOCUMENTS

JP 6-259171 9/1994
JP 10-224200 8/1998

* cited by examiner

*Primary Examiner*—Michael J Sherry
*Assistant Examiner*—Carlos Amaya
(74) *Attorney, Agent, or Firm*—McGinn IP Law Group, PLLC

(57) ABSTRACT

A power supply apparatus that output two types of power supply includes a first series regulator for outputting power supply to a first power supply line, a second series regulator for outputting power supply to a second power supply line, an OR circuit for outputting High level signal to activate the first series regulator upon when detecting presence of either one of output from the second series regulator and an activation command by an ON/OFF control signal, and an AND circuit for outputting High level signal to activate the second series regulator when detecting presence of both of output from the first series regulator and an activation command by the ON/OFF control signal.

20 Claims, 2 Drawing Sheets

POWER SUPPLY APPARATUS

BACKGROUND OF THE INVENTION

1. Field of the Invention

The present invention generally relates to a power supply apparatus that generates a plurality of power supply outputs and more particularly relates to a power supply apparatus that is capable of controlling a starting order and a stopping order of a plurality of power supply outputs.

2. Description of Related Art

A system that includes a plurality of ICs often needs a plurality of different power supply voltages. Further, power saving techniques such as reduction of power supply voltage by manufacturing process minimization are implemented in LSI such as microcomputer and ASIC, which raises the need for a plurality of kinds of power supply voltages in a single LSI.

Some of these LSI require starting and stopping the supply of power supply voltages in a predetermined order. For example, in LSI that requires two kinds of power supply voltages, e.g. 3.3 V and 2.5 V, the controlling order of the power supply voltages may be different between turn-on and turn-off, such as starting the supply of 3.3 V power supply voltage ahead of the other when turning-on the LSI and stopping the supply of 2.5 V power supply voltage ahead of the other when turning-off the LSI.

FIG. 3 shows the configuration of a power supply apparatus 30 that outputs two types of voltages as an example of the above system; i.e. a conventional power supply apparatus that supplies a power supply voltage to LSI or the like. A series regulator 31 steps down and smoothes a voltage supplied through a power supply input terminal 32 and outputs a prescribed output voltage V31 to a power supply output terminal 34. An ON/OFF signal terminal 33 is an input terminal of an ON/OFF signal for controlling the start and stop of the output from the series regulator 31. Similarly, a series regulator 35 steps down and smoothes a voltage supplied through a power supply input terminal 36 and outputs a prescribed output voltage V35 to a power supply output terminal 38. An ON/OFF signal terminal 37 is an input terminal of an ON/OFF signal for controlling the start and stop of the output from the series regulator 35.

In order to control the starting and stopping order of the output from the series regulators 31 and 35 in the power supply apparatus 30 of FIG. 3, it is necessary to input two types of control signals (ON/OFF signals) to the ON/OFF signal terminals 33 and 37. It is possible to differentiate the timing to start output and the timing to stop output between the series regulators 31 and 35 by inserting a delay circuit on an input line of the ON/OFF signal. Still, the starting order and the stopping order of the voltage output are the same in this case, and it is unable to implement the output start and the output stop respectively in opposite orders.

The power supply apparatus that is capable of starting the voltage output and stopping the voltage output in opposite order from each other by a single type of control signal is disclosed in Japanese Unexamined Patent Publications Nos. 10-224200 and 06-259171, which are respectively referred to herein as the related arts 1 and 2. According to the related art 1, when starting the power supply output, the power supply apparatus inputs one type of ON signal, latches the state of the ON signal into a flip-flop, and starts the output of the power supply for the first turn-on according to the output of the flip-flop. Then, it detects a change in the output voltage of the power supply that has been first to turn-on, latches the detected signal into a flip-flop for controlling the output of the second power supply and starts the output of the second power supply according to the output of the flip-flop. By repeating this operation, the apparatus starts the output of a plurality of power supply voltages sequentially. When stopping the voltage output, the apparatus latches the values into flip-flops for output control in the opposite order from the one for turn-on, thereby stopping the power supply output in the opposite order from the one when starting the output.

According to the related art 2, the power supply apparatus monitors a change in the output voltage generated in a plurality of voltage generators with an output monitor using a microcomputer and performs control so that the rise and fall of the outputs from the voltage generators are carried out in a prescribed order.

However, the power supply apparatus of the above related arts that are capable of controlling the starting order and the stopping order of a plurality of power supply outputs needs to use a flip-flop and a microcomputer.

Since the configuration described in the related art 1 controls the output sequence of a plurality of power supplies by using a flip-flop, it is necessary to input a clock signal for the operation of the flip-flop from an external device. This raises the need for a terminal for inputting the clock signal and causes an increase in an IC package size. The configuration also causes a noise on the output signal of the power supply apparatus due to the clock; thus, the configuration without the need for the clock signal is preferred.

The power supply apparatus of the related art 2 monitors a change in the output voltage generated in a plurality of voltage generators with an output monitor using a microcomputer and performs control so as to carry out the rise and fall of the output from the voltage generators in a prescribed order as described above. However, the use of the microcomputer causes large power consumption. It also causes an increase in an IC package size.

SUMMARY OF THE INVENTION

According to an aspect of the present invention, there is provided a power supply apparatus that outputs power supply to a plurality of power supply lines in a prescribed order according to an external ON/OFF control signal, which includes a first power supply output section for outputting power supply to a first power supply line, a second power supply output section for outputting power supply to a second power supply line, a first determination section for determining presence of either one of output from the second power supply output section and an activation instruction by the ON/OFF control signal and activating the first power supply output section, and a second determination section for determining presence of both of output from the first power supply output section and an activation instruction by the ON/OFF control signal and activating the second power supply output section, wherein the first determination section and the second determination section are formed by combinational circuits.

This configuration enables control of a starting order and a stopping order of a plurality of power supply outputs by a determination circuit formed by combinational circuits, thus eliminating the need for using a flip-flop nor a microcomputer.

The present invention provides a power supply apparatus that is capable of controlling the order of power supply outputs with a simple configuration without the need for a clock.

BRIEF DESCRIPTION OF THE DRAWINGS

The above and other objects, advantages and features of the present invention will be more apparent from the following description taken in conjunction with the accompanying drawings, in which.

DESCRIPTION OF THE PREFERRED EMBODIMENTS

The invention will be now described herein with reference to illustrative embodiments. Those skilled in the art will recognize that many alternative embodiments can be accomplished using the teachings of the present invention and that the invention is not limited to the embodiments illustrated for explanatory purposed.

A specific embodiment of the present invention is described hereinafter in detail with reference to the drawings. In the embodiment described below, the present invention is applied to a power supply apparatus using a series regulator.

Figure 1:
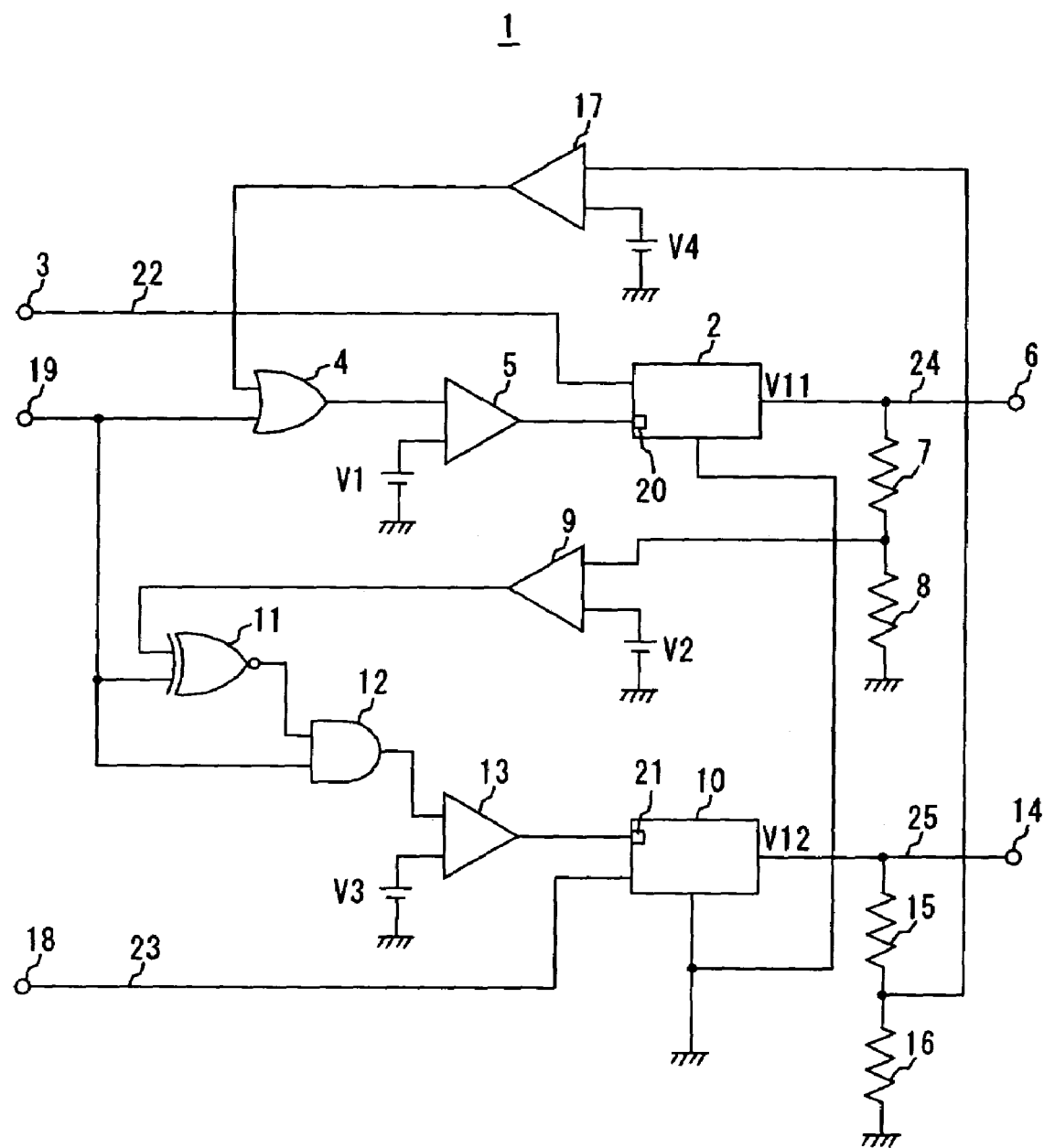
FIG. 1 is a view showing the configuration of a power supply apparatus according to an embodiment of the present invention.

FIG. 1 shows the configuration of a power supply apparatus 1 of this embodiment. A series regulator 2 steps down and smoothes a voltage supplied through a power supply input terminal 3 and a power supply line 22 and outputs a prescribed output voltage V11 to a power supply line 24 and a power supply output terminal 6. An ON/OFF signal terminal 20 of the series regulator 2 is an input terminal of an ON/OFF signal for controlling the start and stop of the output from the series regulator 2. Similarly, a series regulator 10 steps down and smoothes a voltage supplied through a power supply input terminal 18 and a power supply line 23 and outputs a prescribed output voltage V12 to a power supply line 25 and a power supply output terminal 14. An ON/OFF signal terminal 21 of the series regulator 10 is an input terminal of an ON/OFF signal for controlling the start and stop of the output from the series regulator 10.

An ON/OFF control terminal 19 is an input terminal of an ON/OFF signal for controlling the power supply output of the entire power supply apparatus 1. An OR circuit 4, comparators 5, 9, 13 and 17, an EX-NOR circuit 11, an AND circuit 12 and resistors 7, 8, 15 and 16 are elements for controlling the starting order and the stopping order of the two types of power supply outputs from the series regulator 2 and the series regulator 10.

The operation for controlling the output order of the series regulator 2 and the series regulator 10 is described below. In the following example, the series regulator 2 starts the output when a High level signal is input to the ON/OFF signal terminal 20, and the series regulator 2 stops the output when a Low level signal is input to the ON/OFF signal terminal 20. The series regulator 10 operates similarly in response to the input to the ON/OFF signal terminal 21.

When starting the power supply output in the power supply apparatus 1, after applying prescribed voltages to the power supply input terminals 3 and 18 of the power supply apparatus 1, a High level signal is input to the ON/OFF control terminal 19 in order to activate the series regulators 2 and 10 inside the apparatus. The ON/OFF control terminal 19 is connected to the OR circuit 4, and the OR circuit 4 outputs High level when a High level signal is input to the ON/OFF control signal 19. The output of the OR circuit 4 is compared with a reference voltage V1 in the comparator 5. When the output signal level of the OR circuit 4 is higher than a reference voltage V1, the comparator 5 outputs High level. The High level output signal from the comparator 5 is input to the ON/OFF signal terminal 20, thereby generating the output voltage V11 in the series regulator 2.

After the output voltage V11 is generated, the voltage V11 is divided by the resistors 7 and 8 into a voltage suitable for input to the comparator 9. If the voltage V11 exceeds a prescribed value, the comparator 9 outputs a High level signal to the EX-NOR circuit 11. The EX-NOR circuit 11 receives the input signal to the ON/OFF control terminal 19 and the output signal from the comparator 9. The EX-NOR circuit 11 outputs a High level signal if the input signals are both Low level or both High level. Thus, after the High level signal is input to the ON/OFF control terminal 19, the EX-NOR circuit 11 outputs a Low level signal until the series regulator 2 starts the output. After the series regulator 2 starts the output and the output of the comparator 9 changes to High level, the EX-NOR circuit 11 outputs a High level signal.

The output of the EX-NOR circuit 11 is input to the AND circuit 12. If the input signal to the ON/OFF control terminal 19 is High level and then the output of the EX-NOR circuit 11 becomes High level due to the start of output from the series regulator 2, all inputs to the AND circuit 12 are High level, and the AND circuit 12 thereby outputs a High level signal. If the output signal level from the AND circuit 12 exceeds a reference voltage V3, the comparator 13 outputs High level. The High level output signal is input to the ON/OFF signal terminal 21, thereby generating the output voltage V12 of the series regulator 10.

At this time, the output voltage V12 of the series regulator 10 is divided by the resistors 15 and 16 and then input to the comparator 17. A reference voltage V4 of the comparator 17 is set so that the output of the comparator 17 is High level when the series regulator 10 generates a prescribed output. Thus, after both of the series regulators 2 and 10 start the power supply output, the comparator 17 outputs High level, which is input to the OR circuit 4.

The operation to stop the power supply output in the power supply apparatus 1 is described in the following. When the signal level to the ON/OFF control terminal 19 changes from High level to Low level, the output of the OR circuit 4 remains High level. This is because the comparator 17 outputs a High level signal while the series regulator 2 keeps outputting.

On the other hand, when the signal level to the ON/OFF control terminal 19 changes from High level to Low level, the output of the EX-NOR circuit 11 and the AND circuit 12 change to Low level. This is because the EX-NOR circuit 11 receives High level input from the comparator 9 and Low level input from the ON/OFF control terminal 19, and the AND circuit 12 at least receives Low level input from the ON/OFF control terminal 19.

Thus, when the output of the AND circuit 12 changes to Low level, the input signal to the ON/OFF signal terminal 21 through the comparator 13 becomes Low level, so that the power supply output from the series regulator 10 stops ahead of the power supply output from the series regulator 2.

When the power supply output from the series regulator 10 stops, the output signal level of the comparator 17 changes to Low level, and thereby all inputs to the OR circuit 4 are Low level. The input signal to the ON/OFF signal terminal 20 is thus Low level, so that the power supply output from the series regulator 2 stops.

Figure 2:
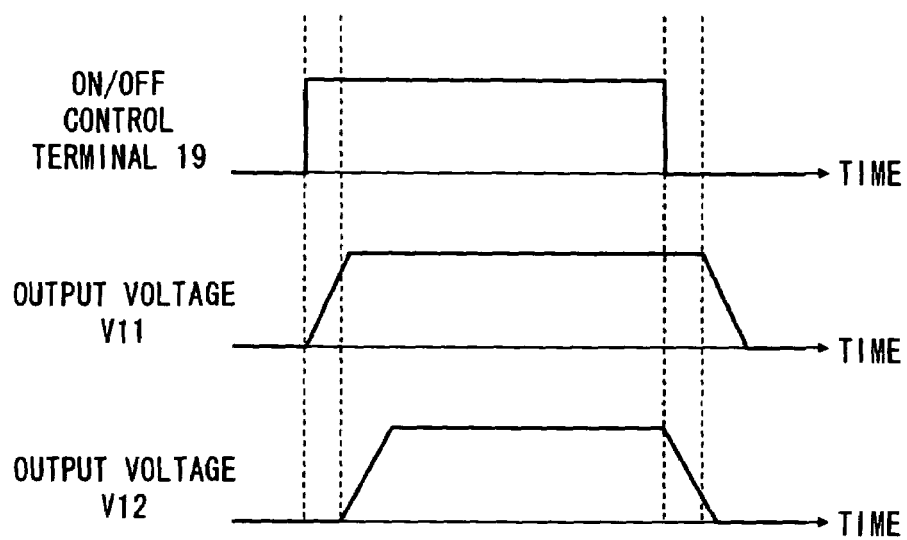
FIG. 2 is a waveform chart showing input/output signals of a power supply apparatus according to an embodiment of the present invention.
Figure 3:
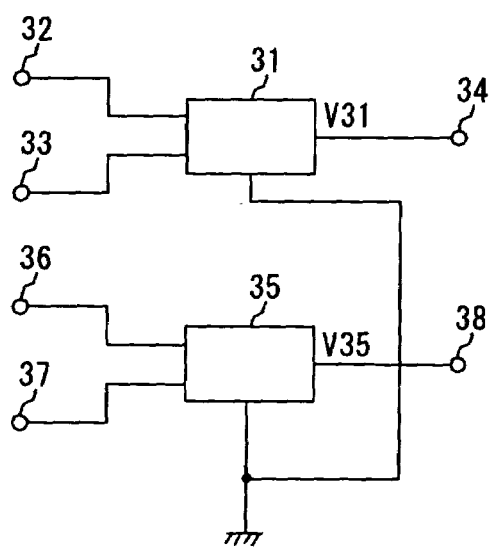
FIG. 3 is a view showing the configuration of a power supply apparatus according to a related art.

The timing to start and stop the output of the output voltages V11 and V12 is described herein with reference to FIG. 2. FIG. 2 is the waveform chart of the output voltages V11 and V12 and the input signal to the ON/OFF control signal terminal 19. When the input signal to the ON/OFF control terminal 19 changes from Low level to High level, the output voltage V11 of the series regulator 2 rises first. In response to the rise of the output voltage V11, the output of the comparator 9 changes to High level, which turns on the series regulator 10 and thereby the output voltage V12 rises.

Then, when the input signal to the ON/OFF control signal terminal 19 changes from High level to Low level, the series regulator 10 stops first and the output voltage V12 falls. In response to the fall of the output voltage V12, the output of the comparator 17 changes to Low level, which turns off the series regulator 2 and thereby the output voltage V11 drops.

A time difference in the rise and fall between the output voltages V11 and V12 is adjustable by changing the reference voltages V3 and V4 of the comparators 9 and 17, respectively. Specifically, the lower the reference voltage V2 of the comparator 9 is, the sooner the timing when the output of the comparator 9 changes to High level in response to the start of output from the series regulator 2 is, thus the earlier the series regulator 10 is activated. Further, the higher the reference voltage V4 of the comparator 17 is, the sooner the timing when the output of the comparator 17 changes to Low level in response to the stop of output from the series regulator 10 is, thus the earlier the series regulator 2 stops the output.

As described in the foregoing, the power supply apparatus 1 of this embodiment places the AND circuit 12 in the previous position of the ON/OFF signal terminal 21 of the series regulator 10 inside the apparatus, thereby setting the High level signal input to the ON/OFF control terminal 19 and the start of output from the series regulator 2 as the preconditions for starting the output from series regulator 10. This configuration enables control of the output starting order of the series regulators 2 and 10 with a single ON/OFF control signal that is input to the ON/OFF control terminal 19, eliminating the need for input of a clock signal and control by a microcomputer which are required in the power supply apparatus of the related arts.

The power supply apparatus 1 of this embodiment places the OR circuit 4 in the previous position of the ON/OFF signal terminal 20 of the series regulator 2 inside the apparatus, thereby setting the Low level signal input to the ON/OFF control terminal 19 and the stop of output from the series regulator 10 as the preconditions for stopping the output from series regulator 2. This configuration enables control of the output stopping order of the series regulators 2 and 10 to be the opposite order from the output starting order with a single ON/OFF control signal that is input to the ON/OFF control terminal 19, eliminating the need for input of a clock signal and control by a microcomputer which are required in the power supply apparatus of the related arts.

Though the above embodiment describes the case where the present invention is applied to the power supply apparatus that uses a series regulator, the present invention may be applied to a power supply apparatus that uses another DC stabilizing means such as a switching regulator. This invention places at least two power supply output sections such as series regulators, and implements output from a first power supply output section when detecting either the output from a second power supply output section or ON command by an ON/OFF signal and implements output from the second power supply output section when detecting both of the output from the first power supply output section and ON command by an ON/OFF signal, Further, this invention enables the above detection with a circuit formed by combinational circuits such as an AND gate, an OR gate, and a comparator.

It is apparent that the present invention is not limited to the above embodiment that may be modified and changed without departing from the scope and spirit of the invention.

What is claimed is:

1. A power supply apparatus that outputs power supply to a plurality of power supply lines in a prescribed order according to an external ON/OFF control signal, comprising:
   a first power supply output section for outputting power supply to a first power supply line;
   a second power supply output section for outputting power supply to a second power supply line;
   a first determination section formed by combinational circuits, for determining presence of one of output from the second power supply output section and an activation instruction by the external ON/OFF control signal, and for activating the first power supply output section; and
   a second determination section formed by combinational circuits, for determining presence of an output from the first power supply output section and an activation instruction by the external ON/OFF control signals and for activating the second power supply output section,
   wherein the first determination section comprises an OR gate, and
   wherein the second determination section comprises:
      an AND gate; and
      an EX-NOR gate coupled to an ON/OFF control terminal which inputs said external ON/OFF control signal.

2. The power supply apparatus according to claim 1, further comprising:
   a first comparator for comparing an output voltage from the first power supply output section with a first reference voltage and supplying a comparison result to the second determination section,
   wherein a time difference in timing to start outputting power supply between the first power supply output section and the second power supply output section is determined depending on a value of the first reference voltage.

3. The power supply apparatus according to claim 2, further comprising:
   a second comparator for comparing an output voltage from the second power supply output section with a second reference voltage and supplying a comparison result to the first determination section,
   wherein a time difference in timing to stop outputting power supply between the first power supply output section and the second power supply output section is determined depending on a value of the second reference voltage.

4. The power supply apparatus in claim 2, wherein said second determination section further comprises:
   said first comparator; and
   a fourth comparator for comparing an output of the AND gate with a fourth reference and supply a comparison result to a second series regulator which is coupled to the second determination section,
   wherein a value of the fourth reference voltage determines whether the second power supply output section outputs power.

5. The power supply apparatus in claim 4, wherein said second determination section further comprises:

a plurality of second resistors for dividing power output from the first power supply output section into a voltage suitable for inputting to said first comparator.

6. The power supply apparatus according to claim 1, further comprising:
a second comparator for comparing an output voltage from the second power supply output section with a second reference voltage and supplying a comparison result to the first determination section,
wherein a time difference in timing to stop outputting power supply between the first power supply output section and the second power supply output section is determined depending on a value of the second reference voltage.

7. The power supply apparatus in claim 6, wherein said first determination section further comprises:
said second comparator; and
a third comparator for comparing an output of the OR gate with a third reference voltage and supplying a comparison result to a first series regulator which is coupled to the first determination section,
wherein a value of the third reference voltage determines whether the first power supply output section outputs power.

8. The power supply apparatus in claim 7, wherein said first determination section further comprises:
a plurality of first resistors for dividing power output from the second power supply output section into a voltage suitable for inputting to said second comparator.

9. The power supply apparatus in claim 1, wherein the power supply apparatus operates independently of clocks and microprocessors.

10. The power supply apparatus in claim 1, wherein the first power supply output section comprises a first series regulator which is coupled to the first determination section.

11. The power supply apparatus in claim 10, wherein the second power supply output section comprises a second series regulator which is coupled to the second determination section.

12. The power supply apparatus in claim 11, wherein an output voltage of the first series regulator rises before an output voltage of the second series regulator.

13. The power supply apparatus in claim 12, wherein the output voltage of the second series regulator falls before the output voltage of the first series regulator.

14. The power supply apparatus in claim 13, wherein the first and second series regulators comprise DC stabilizing switching regulators.

15. The power supply apparatus in claim 11, wherein an output voltage of the second series regulator falls before an output voltage of the first series regulator.

16. The power supply apparatus in claim 1, further comprising:
a first comparator for comparing an output voltage from the first power supply output section with a first reference voltage and supplying a comparison result to said EX-NOR gate; and
a second comparator for comparing an output voltage from the second power supply output section with a second reference voltage and supplying a comparison result to said OR gate.

17. The power supply apparatus in claim 16, wherein a time difference in timing to start outputting power supply between the first power supply output section and the second power supply output section is determined depending on a value of the first reference voltage, and
wherein a time difference in timing to stop outputting power supply between the first power supply output section and the second power supply output section is determined depending on a value of the second reference voltage.

18. The power supply apparatus in claim 1, wherein said OR gate receives an activation instruction by the external ON/OFF control signal.

19. The power supply apparatus in claim 1, wherein said EX-NOR gate receives an activation instruction by the external ON/OFF control signal.

20. A method of outputting power supply using a power supply apparatus, comprising:
outputting power supply to a first power supply line;
outputting power supply to a second power supply line;
determining presence of one of output from the second power supply output section and an activation instruction by the external ON/OFF control signal and activating the first power supply output section by using a first determination section comprising an OR gate; and
determining presence of both an output from the first power supply output section and an activation instruction by the external ON/OFF control signal and activating the second power supply output section by using a second determination section comprising:
an AND gate; and
an EX-NOR gate coupled to an ON/OFF control terminal which inputs said external ON/OFF control signal.

* * * * *